United States Patent Office 3,364,244
Patented Jan. 16, 1968

3,364,244
CYCLIC SILOXANES
Terry G. Selin, Schenectady, N.Y., assignor to General
Electric Company, a corporation of New York
No Drawing. Filed July 1, 1964, Ser. No. 379,713
5 Claims. (Cl. 260—448.2)

ABSTRACT OF THE DISCLOSURE

Cyclotrisiloxanes containing two diorganosiloxane units and one bis-(triorganosiloxy)-siloxane unit are encompassed by the formula,

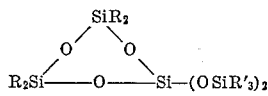

where R and R' may be the same or different and each is selected from the class consisting of alkyl radicals, cycloalkyl radicals, aryl radicals, aralkyl radicals, alkenyl radicals, halogenated monovalent hydrocarbon radicals and cyanoalkyl radicals. Compounds within the scope of the present disclosure may be prepared by reacting

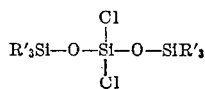

with

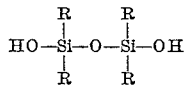

The cyclotrisiloxanes of the present disclosure are useful in making ordered polysiloxanes which are useful as wire insulation which remains flexible over a wide temperature range.

---

This invention relates to cyclic siloxane compounds which are useful in the preparation of polysiloxanes. More particularly, the invention is directed to a cyclic siloxane composition having siloxane substituents.

The invention relates, in particular, to cyclotrisiloxanes having the formula:

(1) 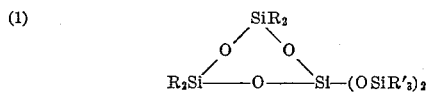

where R and R' represent monovalent organic substituents. Among the substituents which R and R' represent are alkyl radicals, such as, methyl, ethyl, propyl, butyl, octyl, dodecyl, isopropyl, isobutyl, etc.; cycloalkyl radicals, such as, cyclohexyl, cyclopentyl, cycloheptyl, etc.; aryl radicals, such as, phenyl, biphenyl, naphthyl, benzoylphenyl and paraphenoxyphenyl, tolyl, xylyl, etc.; aralkyl radicals such as, benzyl, phenylethyl, etc; alkenyl radicals, such as, vinyl, allyl, etc.; halogenated monovalent hydrocarbon radicals, such as, chloromethyl, dibromophenyl, trifluoromethylpropyl, trifluoromethylphenyl, etc.; cyanoalkyl radicals, such as, cyanomethyl, alpha-cyanoethyl, beta-cyanoethyl, beta-cyanopropyl, gamma-cyanopropyl, delta-cyanobutyl, cyanophenyl, etc.

The preferred group of compounds meeting the generic Formula 1 are those where R and R' are selected from the group consisting of methyl and phenyl. Thus, within this definition, the following compounds are included:

(2) 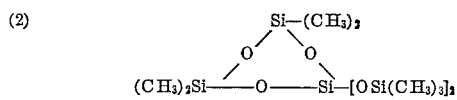

(3)

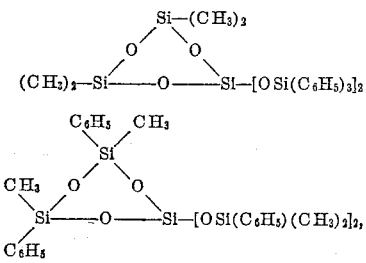

etc.

The composition of the present invention can be formed by the interaction of a 1,1,1,5,5,5-hexaorgano-3,3-dihydroxy or -3,3-dichlorotrisiloxane having the formula:

(5) 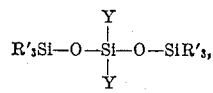

where R' is as above defined, and Y is selected from the group consisting of hydroxyl groups and chlorine atoms, and a dichloro or dihydroxy tetraorganodisiloxane having the formula:

(6) 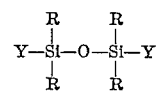

where R and Y are as above defined. The product is formed by the dehydrochlorination of the various chloro and hydroxyl radicals, so that it is obvious that while either compound may have the chloro or hydroxyl radical, the radicals in one compound must be different from those in the other compound. The preferred compounds would thus be formed where R and R' in the Formulas 5 and 6 are selected from the group consisting of methyl and phenyl.

Thus, for example, the trisiloxanes represented by Formula 5 might be selected from one of the following:

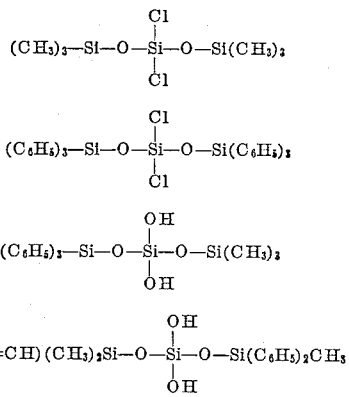

The disiloxane represented by the Formula 6 might be selected from one of the following:

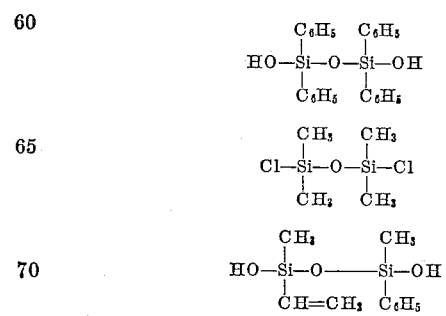

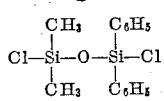

The progress of the reaction of the two compounds may be represented by the following equation:

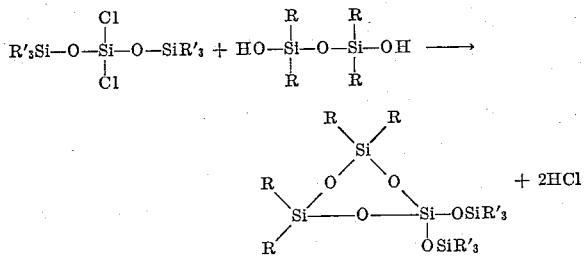

Thus, whatever the exact radicals designated by R, R', and Y are, the final product is cyclotrisiloxane where one of the silicon atoms within the ring is further attached through siloxane linkages to two silicon atoms external to the ring, these silicon atoms having organic substituents.

The reaction is conducted by mixing suitable quantities of the two reaction components in a solvent solution. Further, the reaction mixture generally contains an acid acceptor which removes the byproduct of the dehydrochlorination to avoid undesirable side reaction. The cyclotrisiloxanes of the present invention are isolated from the reaction mixture.

The process will now be described in greater detail. The preferred ratio of reactants is the stoichiometric one, that is, one mole of the trisiloxane for each mole of the disiloxane. However, the reaction may be conducted with a ratio of reactants of from 2:1 to 1:2. Preferably, the reactants are added simultaneously, but the hydroxylated compound, whether the trisiloxane or the disiloxane, can be added first, and the chlorinated compound added to it. The dehydrochlorination reaction will proceed at temperatures of from 0° C. to 80° C. However, the preferred range is from 25° C. to 35° C. The reaction requires from ½ to 1 hour, generally, but is almost always complete in less than 3 hours.

A wide variety of solvents are acceptable for conducting the present reaction. For example, hydrocarbons generally, particularly benzene, can be utilized. Additionally, straight chain paraffinic compounds and unsubstituted cyclic compounds can be utilized. Organic ethers can also be used, however, the resulting yield is much lower than when one of the solvents mentioned above is selected. There should be at least one part of solvent for each part of reactant employed. There is no maximum limit to the amount of solvent which can be used, except that the rate of reaction is diminished considerably as the amount of solvent utilized is increased. However, preferably there should be from two to three parts of solvent for each part of reactant.

Acid acceptors are necessary in conducting the reaction. When such acceptors are not present, undesirable side reactions result. The amines are particularly advantageous acid acceptors. Each mole of an amine will absorb approximately one mole of hydrogen halide. Therefore, there should be one mole of the amine present for each mole of hydrogen halide to be generated. Among the amines which can be used as acid acceptors, without otherwise adversely affecting the reaction, are tertiary amines such as pyridine, picoline, quinoline, 1,4-diazabicyclo-(2,2,2)-octane, or a dialkyl aniline. No catalyst is needed for the reaction.

Following the reaction between the trisiloxane of Formula 5 and the diorganosiloxane of Formula 6, the cyclotrisiloxanes of the present invention are isolated from the reaction mixture by any conventional means. For example, in the case of the low boiling cyclotrisiloxanes in which a majority of the silicon-bonded organic groups are methyl groups, fractional distillation can be used to isolate the product. In other cases, the product can be isolated by washing the reaction mixture with water to remove the hydrochloride of the acid acceptor. Thereafter, the solvent used in the reaction can be removed, for example, by distillation, resulting in the cyclotrisiloxane of the present invention. In some cases, it is desired to further purify these cyclotrisoxanes. This further purification can be accomplished by recrystallization from any suitable solvent, such as an alkanol having from one to six carbon atoms.

The following examples are illustrative of the formation of the products of the present invention. These examples should not be considered as limiting in any way the full scope of the invention as covered by the appended claims.

*Example 1*

A 2-liter Morton flask, equipped with a mechanical stirrer and two addition funnels, was charged with 19.8 gm. (0.25 mole) of dry pyridine and 300 ml. of anhydrous ether. The mixture was cooled to 0° C. while a solution of 27.7 g. 1,1,1,5,5,5-hexamethyl-3,3-dichlorotrisiloxane $[([CH_3]_3SiO)_2SiCl_2]$ in 100 ml. ether and a solution of 18.2 g. tetramethyldihydroxydisiloxane $[HOSi(CH_3)_2OSi(CH_3)_2OH]$ in 100 ml. ether were added simultaneously over a 3-hour period. The resulting pyridine salts were removed by filtration and the ether solution washed to remove excess pyridine. Fractional distillation yielded 9.4 gm. of a liquid material having the formula:

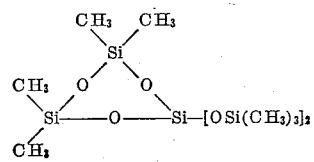

This material contained 32.30 percent carbon, 8.14 percent hydrogen and 37.79 percent silicon as compared with the theoretical values of 32.42 percent carbon, 8.11 percent hydrogen and 37.84 percent silicon. The material had a density at 20° C. of 1.3986 and a boiling point of 69–70° C. at 2.5 mm.

*Example 2*

A 500 ml. 3-necked flask was equipped with a magnetic stirrer, reflux condenser, thermometer, and two addition funnels. The flask was charged with 3.9 gm. (0.05 mole) of dry pyridine dissolved in 50 ml. of ether. One addition funnel was charged with 6.0 gm. (0.025 mole) of 1,1,1,5,5,5-hexamethyl-3,3-dihydroxytrisiloxane $$[([CH_3]_3SiO)_2Si(OH)_2]$$

dissolved in 40 ml. of ether and the other addition funnel was charged with 11.3 gm. (0.025 mole) of tetraphenyldichlorodisiloxane $[(Cl[C_6H_5]_2Si)_2O]$ also dissolved in 40 ml. of ether. These solutions were simultaneously added with stirring to the pyridine solution over a period of 2 hours, while maintaining an average temperature of 25° C. Water was then added to dissolve the salts and the ether phase washed several times with water. Removal of the solvent yielded 13.7 gm. (97%) of a crystalline product having the formula:

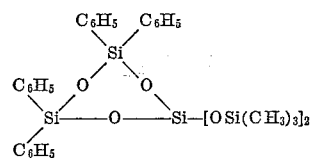

This material contained 58.50 percent carbon, 6.13 percent hydrogen and 22.60 percent silicon as compared with the theoretical values of 58.25 percent carbon, 6.15 percent hydrogen and 22.65 percent silicon. Upon recrystallization from hexane, this material melted sharply at 89–90° C.

Example 3

A 500 ml. 3-necked flask is equipped with a magnetic stirrer, a reflux condenser, a thermometer, and two addition funnels. The flask is charged with 3.9 gm. (0.05 mole) of dry pyridine dissolved in 50 ml. of ether. One addition funnel is charged with 6.0 gm. (0.025 mole) of 1,1,1,5,5,5-hexamethyl-3,3-dihydroxytrisiloxane

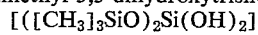

dissolved in 40 ml. of ether and the other addition funnel is charged with 8.2 gm. (0.025 mole) of dimethyldiphenyldichlorodisiloxane [(Cl[C$_6$H$_5$][CH$_3$]Si)$_2$O] also dissolved in 40 ml. of ether. These solutions are simultaneously added with stirring to the pyridine solution over a period of 2 hours while maintaining a temperature of 25° C. Water is added to dissolve the salts and the ether phase is washed several times with water. Removal of the solvent yields a material having the formula:

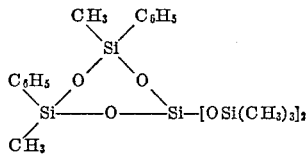

The cyclotrisiloxanes of the present invention are useful in the preparation of linear organopolysiloxanes containing recurring structural units derived from the cyclotrisiloxane and which are characterized by the presence of two diorganosiloxane units and one bis(triorganosiloxy)siloxane unit.

These linear polysiloxanes are prepared by mixing the cyclotrisiloxanes of the present invention with a suitable organopolysiloxane rearrangement and condensation catalyst, such as potassium hydroxide, employing the potassium hydroxide in an amount equal to from about 10 to 1,000 parts of the potassium hydroxide per million parts of the cyclotrisiloxane. Upon heating of this mixture to a temperature of from about 60 to 140° C., depending upon the particular cyclotrisiloxane, the cyclotrisiloxane is converted in a period of from a few seconds to several hours to a high molecular weight linear gum. For example, the cyclotrisiloxane formed in Example 1 is converted to a polymeric gum consisting of recurring units having the formula:

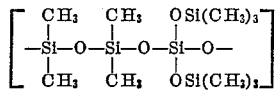

The linear polysiloxane gums, such as the ones described above, can be converted to cured silicone rubber by mixing the gum in an amount equal to, for example, 100 parts of the gum with 40 parts of a finely divided silica filler, such as a fumed silica, and 3 parts of an organoperoxide vulcanizing agent, such as benzoyl peroxide. The resulting composition can be press-cured for 15 minutes at 150° C. and then oven cured for 24 hours at 175° C. to form a cured silicone rubber article. These silicone rubbers can be employed as insulation for electrical conductors, as gasketing materials and the like.

While specific embodiments have been shown and described, the invention should not be limited to the particular compositions. It is intended, therefore, by the appended claims to cover all modifications within the spirit and scope of this invention.

What I claim as new and desire to secure by Letters Patent of the United States is:

1. A cyclosiloxane composition having the structure:

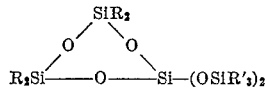

where R and R' each represent a monovalent organic substituent selected from the class consisting of alkyl radicals, cycloalkyl radicals, aryl radicals, aralkyl radicals, alkenyl radicals, halogenated monovalent hydrocarbon radicals, and cyanoalkyl radicals.

2. The composition of claim 1 wherein R and R' are each methyl.

3. The composition of claim 1 wherein R is phenyl and R' is methyl.

4. The composition of claim 1 wherein R is both methyl and phenyl and R' is both methyl and phenyl.

5. The composition of claim 1 wherein R is both methyl and phenyl and R' is methyl.

References Cited

UNITED STATES PATENTS

| | | | |
|---|---|---|---|
| 3,308,147 | 3/1967 | Lentz | 260—448.2 |
| 3,308,152 | 3/1967 | Lentz | 260—448.2 |
| 3,310,526 | 3/1967 | Sporck | 260—448.2 X |

OTHER REFERENCES

Andrianov et al., "Doklady Akad Nauk. USSR," vol. 126, No. 5 (1959), pp. 997–1000.

HELEN M. McCARTHY, *Primary Examiner.*

TOBIAS E. LEVOW, *Examiner.*

P. F. SHAVER, *Assistant Examiner.*